United States Patent [19]

Bray et al.

[11] 4,356,490
[45] Oct. 26, 1982

[54] TRANSMISSION FREQUENCY DIVERSITY RADAR

[75] Inventors: David W. Bray, Ludlowville; John L. David, Clinton; Erman E. Ferris, Ithaca, all of, N.Y.

[73] Assignee: General Electric Company, Utica, N.Y.

[21] Appl. No.: 407,626

[22] Filed: Oct. 27, 1964

Related U.S. Application Data

[63] Continuation-in-part of Ser. No. 855,954, Nov. 25, 1959, abandoned.

[51] Int. Cl.³ .............................................. G01S 13/24
[52] U.S. Cl. .............................. 343/17.2 R; 343/18 E
[58] Field of Search ............... 343/5 AFC, 17.1, 17.2, 343/17.5, 14, 17.2 R, 18 E

[56] References Cited

U.S. PATENT DOCUMENTS

| | | | |
|---|---|---|---|
| 3,050,726 | 8/1962 | Laurent | 343/18 E X |
| 3,114,148 | 12/1963 | Lederman | 343/18 E X |
| 3,163,862 | 12/1964 | Jenny | 343/18 E X |
| 3,374,480 | 3/1968 | Russell et al. | 343/17.2 R |
| 3,858,219 | 12/1974 | Hull | 343/17.2 R |
| 3,866,224 | 2/1975 | Porter et al. | 343/17.2 R |
| 3,981,012 | 9/1976 | Brault et al. | 343/17.2 R X |
| 4,068,235 | 1/1978 | Peters, Jr. et al. | 343/17.2 R |
| 4,135,189 | 1/1979 | Josse | 343/17.2 R X |
| 4,157,546 | 6/1979 | Brault et al. | 343/17.2 R |

Primary Examiner—T. H. Tubbesing
Attorney, Agent, or Firm—Stephen A. Young

EXEMPLARY CLAIM

1. A transmission frequency diversity radar system comprising an oscillator that is tunable over a frequency band to produce a signal for radar transmission, means for tuning said oscillator randomly on a random frequency basis, and means for frequency tracking the signal being transmitted including a variable frequency local oscillator, means to sweep the local oscillator over a range of frequencies within the pulse width time of the radar transmitted signal but after said transmission oscillator is tuned and modulator means responsive to the transmitted signal for holding said variable local oscillator on the proper tuning frequency.

6 Claims, 5 Drawing Figures

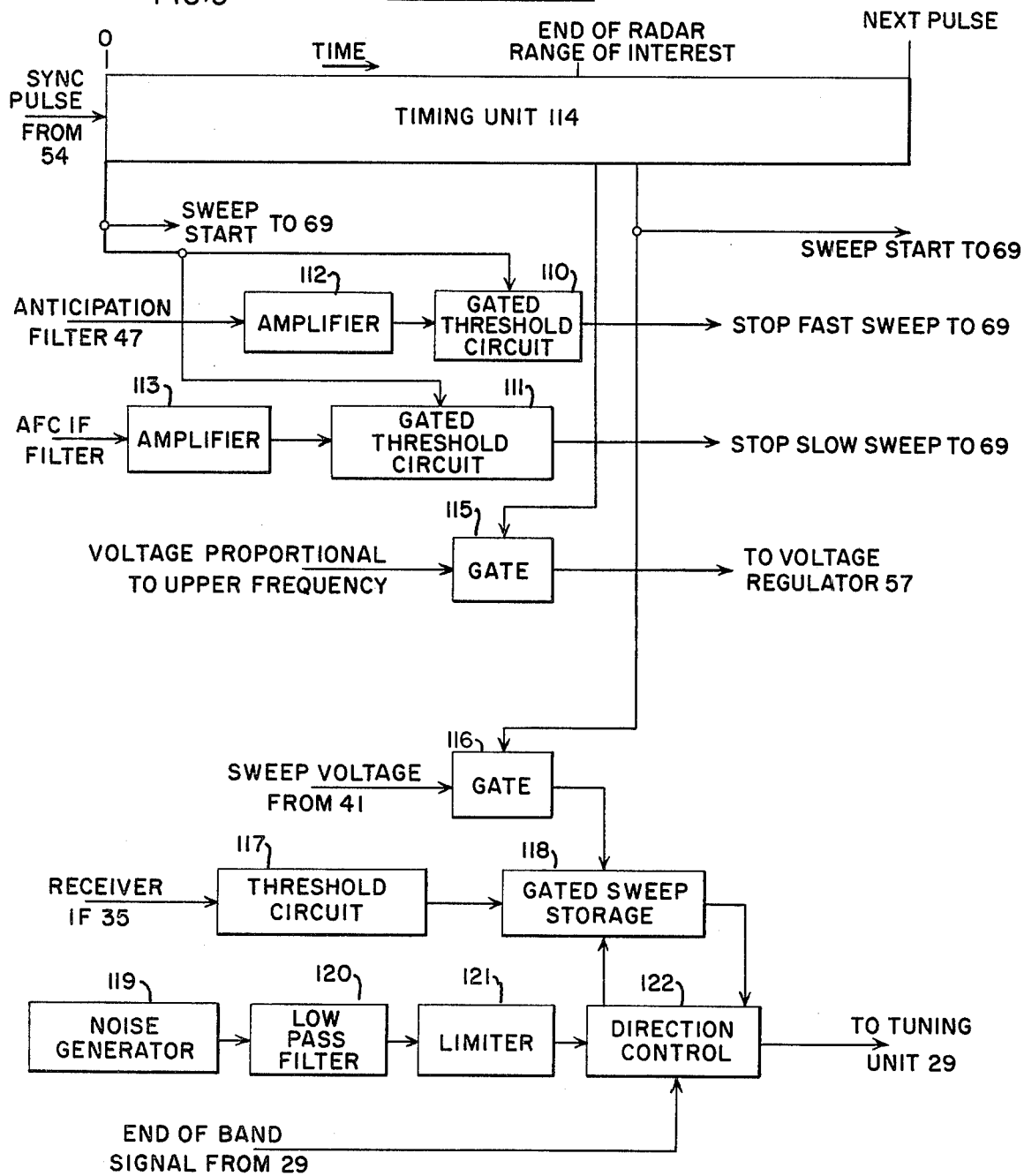

TRANSMISSION FREQUENCY DIVERSITY RADAR

This is a continuation-in-part of application Ser. No. 855,954 filed Nov. 25, 1959, now abandoned.

The present invention relates generally to radar systems and more particularly to a transmission frequency diversity radar system.

Since World War II, radar advances have increased rapidly to the point where present radar systems provide a high degree of perfection permitting its use in detecting unfriendly equipment and also controlling gunfire to destroy that equipment. Although the details of the various radar systems differ, depending upon the particular type and use for which it is intended, the basic principles are the same.

A series of accurately timed and very short pulses of radio frequency are transmitted by a directional antenna. Since these pulses represent only a small part of the total time, the power in the pulses may be quite high without the average power becoming excessive. If these radio signals strike a conducting object some of the energy is reflected. The reflected pulses may then be picked up by the radar receiving system. Basically, the direction of the antenna (when a reflection is detected) gives the direction to the object, and the time between the transmission of the pulse and its return gives the distance.

In the radar art, particularly in airborne and missile applications, it has become increasingly important for radar systems to keep pace with and overcome the advances made in jamming techniques, such as, in countermeasure systems. Conventional radars are unuseable or rendered unreliable because of the countermeasures capabilities existing at the present time.

There has been developed pulse-to-pulse type tunable radar systems which are capable of operation during jamming by an unfriendly transmitter. This type of system has in the past demonstrated its resistance to jamming. Briefly, this type of system has the ability to take a preliminary "look-through" and program to a different frequency on a pulse-to-pulse basis when it detects jamming. This feature is made possible by a tuned-oscillator, power-amplifier design, a design in turn made possible by the development of high-powered X-band traveling-wave tubes. The pulse-to-pulse frequency signals are generated at low level and then amplified directly at the transmission frequency to a reasonable power output by a chain of traveling-wave tubes. Frequency dispersal permits a higher pulse repetition frequency than in conventional radars, which yields a higher rate of information and an extended range.

At the present time frequency diversity radars are extremely heavy and bulky. The increased weight existing in this type of radar system is a result of the required traveling-wave tube chain included therein. Thus, frequency diversity type radar systems have limited application in airborne and missile areas because of the large size and weight of the traveling-wave tubes.

It is an object of the present invention to provide a frequency diversity type radar technique in a magnetron radar system.

Another object of the present invention is to provide a pulse-to-pulse tunable radar system that is lighter in weight and size and capable of application to missile and airborne applications.

A further object of the invention is to provide means for converting an existing radar system to a frequency diversity radar system requiring few changes and small increase in components.

Still another object of the invention is to provide a pulse-to-pulse tunable radar system that does not require traveling-wave tube chains therein.

A still further object of the invention is to provide in a pulse-to-pulse type radar system an automatic local oscillator frequency control system that is capable of following a fast-tuned magnetron.

Other objects and many of the attendant advantages of the invention will be readily appreciated as the same becomes better understood by reference to the following detailed description when considered in connection with the drawings in which:

FIG. 5 illustrates in block diagram form one form of programmer suitable for use in the FIG. 2 system.

It is well known that when countermeasures equipment aboard an aircraft are in operation, it can be expected that such countermeasures equipment will interfere with the operation of the radar equipment on the same aircraft. This leads to a problem of being able to isolate the radar equipment from the countermeasures equipment so as to prevent degradation of the performance of the radar. In addition, radar systems aboard the same aircraft may also interfere with the operation of a particular radar system. Still further, and of greater importance, unfriendly countermeasures equipment provides an extremely dangerous threat to proper the operation of a particular radar on the aircraft. It is well recognized that an unfriendly adversary would have the same capability for jamming equipment that we would have. This type of jamming equipment can be in the form or airborne or ground-based type equipment.

In brief, applicants' invention comprises the use of a magnetron as a power output device to obtain a transmission frequency diversity radar system. A rapidly swept automatic frequency controlled device is utilized to tune the local oscillator of the radar system to a frequency so that the difference between the high power magnetron and the local oscillator is the intermediate frequency of the system. This tuning occurs within the pulse width of the radar transmitted signal.

Figure 1:
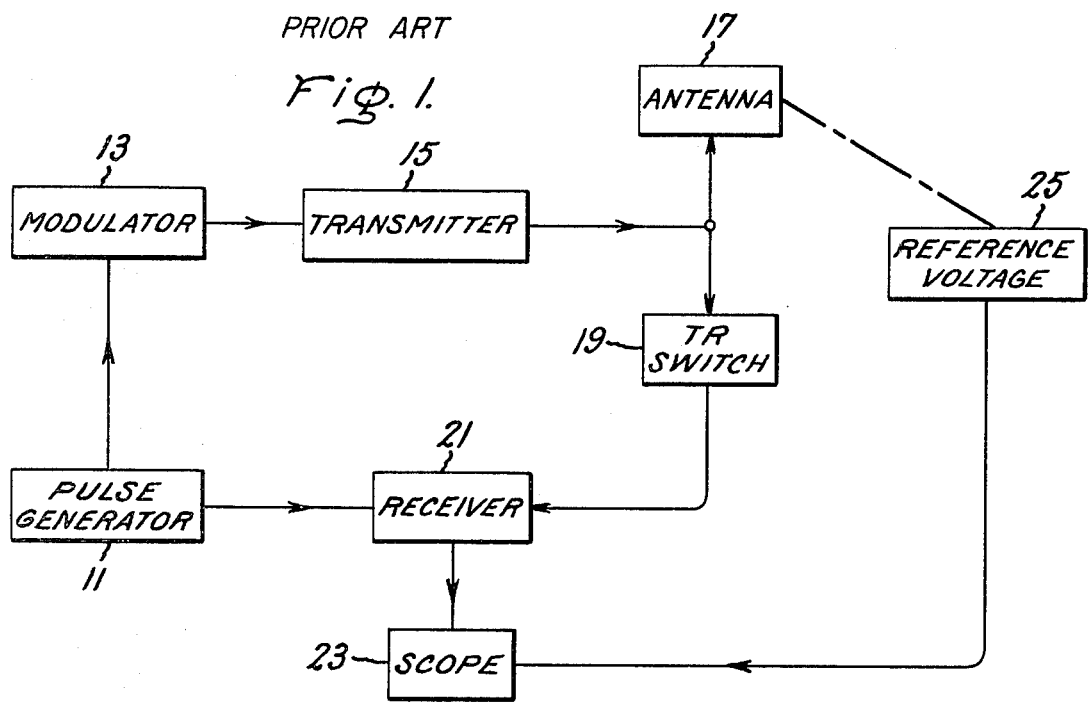
FIG. 1 illustrates in block diagram form a ground or airborne, tracking or search radar system of conventional design.

For the purpose of more clearly illustrating applicants' invention, reference will be made to FIG. 1 in which there is shown a conventional search and fire control radar system that is used against aircraft. As seen in FIG. 1, a synchronizer or pulse generator 11 controls the sequence of operations of the radar system by supplying a keying pulse to the transmitting system and at the same time a reference pulse to the receiving system. This keying pulse is shaped and amplified in a modulator unit 13 and is then applied to the transmitter 15. In the transmitter unit the shaped and amplified pulse serves to key the pulse of the radio frequency energy, the high frequency pulse being fed to the antenna 17 from transmitter unit 15.

The field to be observed is scanned by antenna 17 and its radio signal. Various types of antenna structures are commonly used, but all are directional and the direction may be changed at will. It is to be understood that some radars use separate transmitting and receiving antennas, although most use a common antenna for both functions. A transmit-receive switch 19 being an electronic switch which cuts out the receiver circuits when a pulse is being transmitted and then opens them between transmitted pulses so that they will be ready for the received pulses is utilized. The range of the radar is limited by the distance a signal can travel out and back between transmitted pulses, since one pulse must make a complete trip before the next one starts. The receiving signal is compared in a receiver 21 with the signal originally generated in the pulse generator 11, the time difference yielding the time of travel of the radio wave and, hence, the distance.

Various methods of indicating distance exist today, but cathode ray oscilloscopes are generally used as the comparison indicators. If, for example, the received signal from the pulse generator 11 initiates the sweep circuit of the oscilloscope and that the sweep takes a definite and known time to traverse the oscilloscope screen, this may be accurately adjusted by means of the circuit constants of the sweep circuit. If the returned signal from the receiver 21 is fed to the other set of plates of the oscilloscope, it will appear as a "blip" or "pip" on the trace. In many cases, time delays are included in the circuits and are adjustable to improve the accuracy of ranging. Connected with the antenna scanning mechanism is a reference voltage generator 25 whose output is also fed into the receiving system to indicate direction to the reflecting plane when a pulse is received. By well known electronic techniques this reference voltage may be compared with the received pulse in such a way as to indicate on scope 23 to the radar operator when he is pointing directly at the target. It will be recognized that many other well-known displays may be utilized to provide this information.

Figure 2:
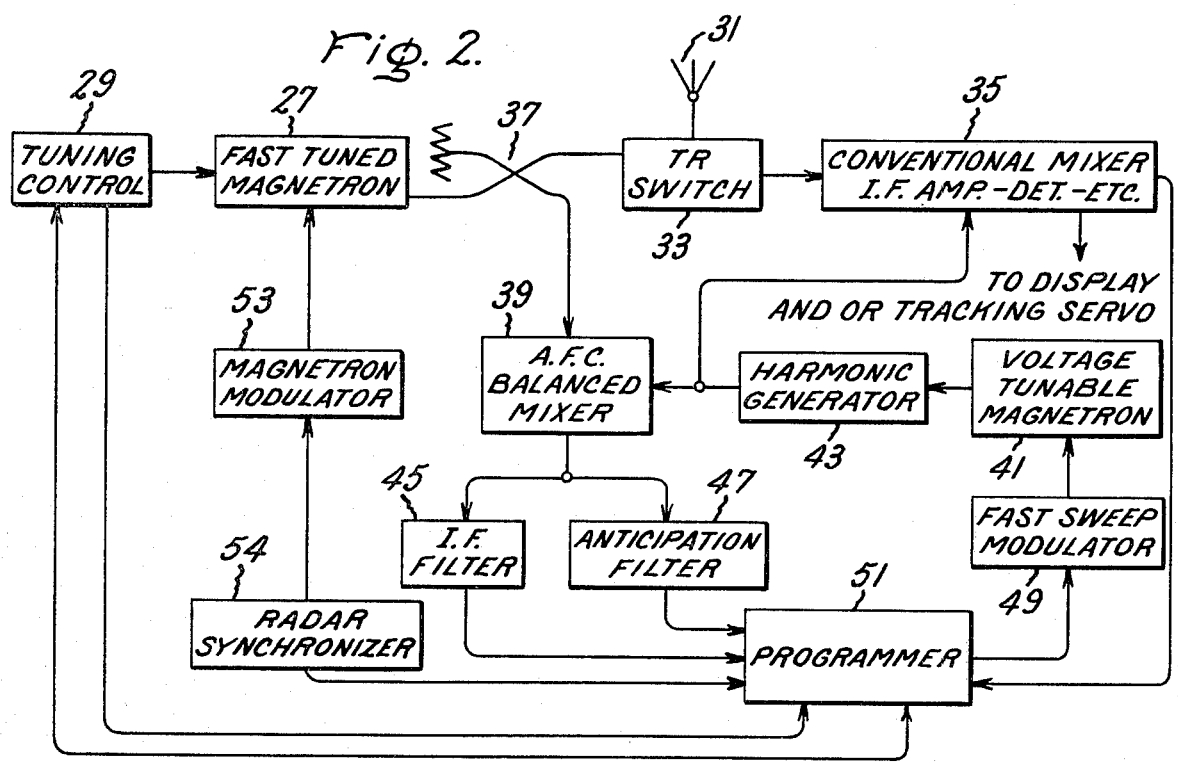
FIG. 2 illustrates in block diagram form one embodiment of a transmission frequency diversity radar system.

In FIG. 2 there is illustrated one embodiment of a conventional type radar system modified to permit pulse-to-pulse frequency diversity in accordance with this invention. While the discussion will be related to a pulse-to-pulse type system, it will be recognized that the system is applicable to a continuous wave (CW) system such as the frequency modulated type (wherein the initial frequency for each sweep is adjusted in the same manner as the pulse transmission frequency herein). As shown in FIG. 2, there is provided a frequency dispersion transmit or fast tuned magnetron that is tunable over a desired frequency band. Magnetron 27 is capable of producing a high power pulsed signal to be fed to an antenna 31. Two specific types of magnetrons that may be used to practice the invention are the QK-788 and L-3211. A tuning control 29 (shown separately) for the pulsed magnetron 27 may be either a mechanical, hydraulic, or electrical device which is well known in the radar art. In a preferable embodiment the tuning control mechanism 29 is hydraulically tuned to control the transmitted frequency of the magnetron. This tuning control mechanism also has a coarse frequency pick-off which would be determined by the mechanical position of the magnetron cavity. Included in tuning control 29 are a hydraulic valve system (feedback means), an error generator, amplifier and an actuator for magnetron 27.

Magnetron 27 is coupled to an antenna 31 through a transmit-receive switch 33 of the required bandwidth. Transmit-receive switch 33 is a conventional component and is designed to have a frequency bandwidth comparable to that of the tunable pulsed magnetron 27. On the isolated side of transmit-receive switch 33 there is coupled the normal radar receiver 35 which includes a conventional mixer, IF amplifier, detectors, etc. Since these circuits are well-known to the art, no further discussion is deemed required to practice applicants' invention.

Magnetron 27 is also coupled through a large attenuation microwave coupler 37 to an automatic frequency control (AFC) balanced mixer 39. Balanced mixer 39 is a conventional mixer having a bandwidth commensurate with that of the pulsed magnetron 27 and transmit-receive switch 33. In addition to the input received from the pulsed magnetron 27 through coupler 37, the balanced mixer also receives an signal from a local oscillator unit which is derived from a voltage tunable magnetron (VTM) 41 and a harmonic generator 43, if the output frequency of the voltage tunable magnetron 41 is not in the correct frequency band. Voltage tunable magnetron 41 is, in essence, a CW oscillator device that produces power at microwave frequencies. Various types of commercially available voltage tunable magnetrons may be employed, such as types GL-7398 or Z-5266, Z-5360, Z-5321 and Z-5300. The output frequency of magnetron 41 is determined by the voltage applied between its cathode and anode.

Magnetron 41 generates the local oscillator signal for the receiver of the system. While a voltage tunable magnetron is illustrated in the embodiment shown in FIG. 2, it will be recognized by those skilled in the art that other microwave devices that are voltage tunable can be employed, such as the backward wave oscillator, types QK-529 and QK-543 in place of the voltage tunable magnetron 41. Harmonic generator 43 converts the frequency of the voltage tunable magnetron 41 to a higher frequency where the voltage tunable magnetron 41 is not available in the desired frequency band to be used. However, it is to be recognized that harmonic generator 43 is not essential to practice the present invention.

As shown in FIG. 2, the output signal of balanced mixer 39 is fed to an IF section including conventional band-pass filters 45 and 47. Intermediate frequency (IF) filter 45 is an electrical filter whose band-pass characteristic is equal to that of the intermediate frequency amplifier of the system. A representative frequency range would be 30–60 MCS. Anticipation filter 47 is an electrical filter whose band-pass characteristic is tuned to a higher frequency than that of the intermediate frequency filter 45. This frequency range may be 30 to 60 MCS above the IF frequency. In the particular embodiment shown in FIG. 2 anticipation filter 47 is tuned to a higher frequency than the IF filter 45 which is the same frequency as the intermediate frequency amplifier in the receiver 35. The output of the filters 45 and 47 control the fast sweep control section or fast sweep modulator 49 through the programmer 51.

Sweep control section or fast sweep modulator 49 sweeps the voltage (and, therefore, frequency) of voltage tunable magnetron 41 to change its frequency output such that after automatic frequency control action, as described hereinafter in connection with FIG. 3, the difference frequency between the fast tuned magnetron 27 and the local oscillator 41 (or harmonic generator 43, where required) is equal to the intermediate frequency of the system. Programmer 51, in essence, is an electronic device which controls the tuning of fast-tuned magnetron 27 and the automatic frequency control means of the system. In addition to controlling the timing of the sequence of events of the system, it can store information such as jamming frequencies and program the frequency of fast tuned magnetron 27 in accordance with the stored frequency information. The programmer provides three basic functions, namely, the timing of the automatic frequency control events, frequency programming of the fast tuned magnetron 27, and sensing and storage of interfering frequencies. These functions are accomplished by conventional electronic computer techniques. The programmer complexity is a function of the requirements of the particular radar system. Magnetron modulator 53 is a conventional modulator for pulsing the fast tuned magnetron 27.

The operation of the radar system shown in FIG. 2 is as follows. The instantaneous frequency of fast tuned magnetron 27 is sensed by the tuning control mechanism 29. This sensed signal is fed to programmer 51 and, in turn, to voltage tunable magnetron 41 through the fast sweep modulator 49. The sensed signal controls the resting voltage, and, therefore, the resting frequency of the voltage tunable magnetron. This resting frequency is higher in frequency than the estimated frequency of fast tuned magnetron 27. Upon receipt of a radar timing pulse from the radar synchronizer 54, the fast sweep modulator 49 begins to decrease its output voltage. This voltage sweeps the voltage tunable magnetron 41 down in frequency. When the voltage tunable magnetron's frequency (local oscillator signal) is different from the fast tuned magnetron's frequency by the frequency of the anticipation filter 47, programmer 51 signals the fast sweep modulator 49 to reduce the sweep rate.

This sweep rate is then continued at the reduced rate until the maximum output of the intermediate frequency filter 45 is reached. Upon receiving the output signal from the intermediate frequency filter 45, programmer 51 stops the voltage tunable magnetron 41 on a frequency such that the correct intermediate frequency is obtained. This automatic frequency control sweeping action takes place within the pulse length of the transmitted signal. Fast sweep modulator 49 then holds the voltage at which it stopped for the length of time required to receive all desired radar echos impinging on antenna 31. In this interval the fast tuned magnetron 27 is tuned to the new frequency which is determined by programmer 51 through tuning control mechanism 29.

In order to increase the anti-jamming capabilities of the radar system as illustrated in FIG. 2, a reprogramming function is provided within programmer 51. After all of the radar echos are received in receiver unit 35, the fast sweep modulator 49 tunes the voltage tunable magnetron 41 to the high end of the desired frequency band and sweeps down across the entire frequency band, noting through the intermediate frequency amplifier in receiver 35 areas of jamming in the frequency band. These areas are stored in the programmer 51 and are used to position the fast tuned magnetron 27 to the best (unjammed) frequency. At every pulse of the fast tuned magnetron 27, the automatic frequency control operation is the same; it always sweeps from the high side of the fast tuned magnetron's estimated frequency.

Figure 3:
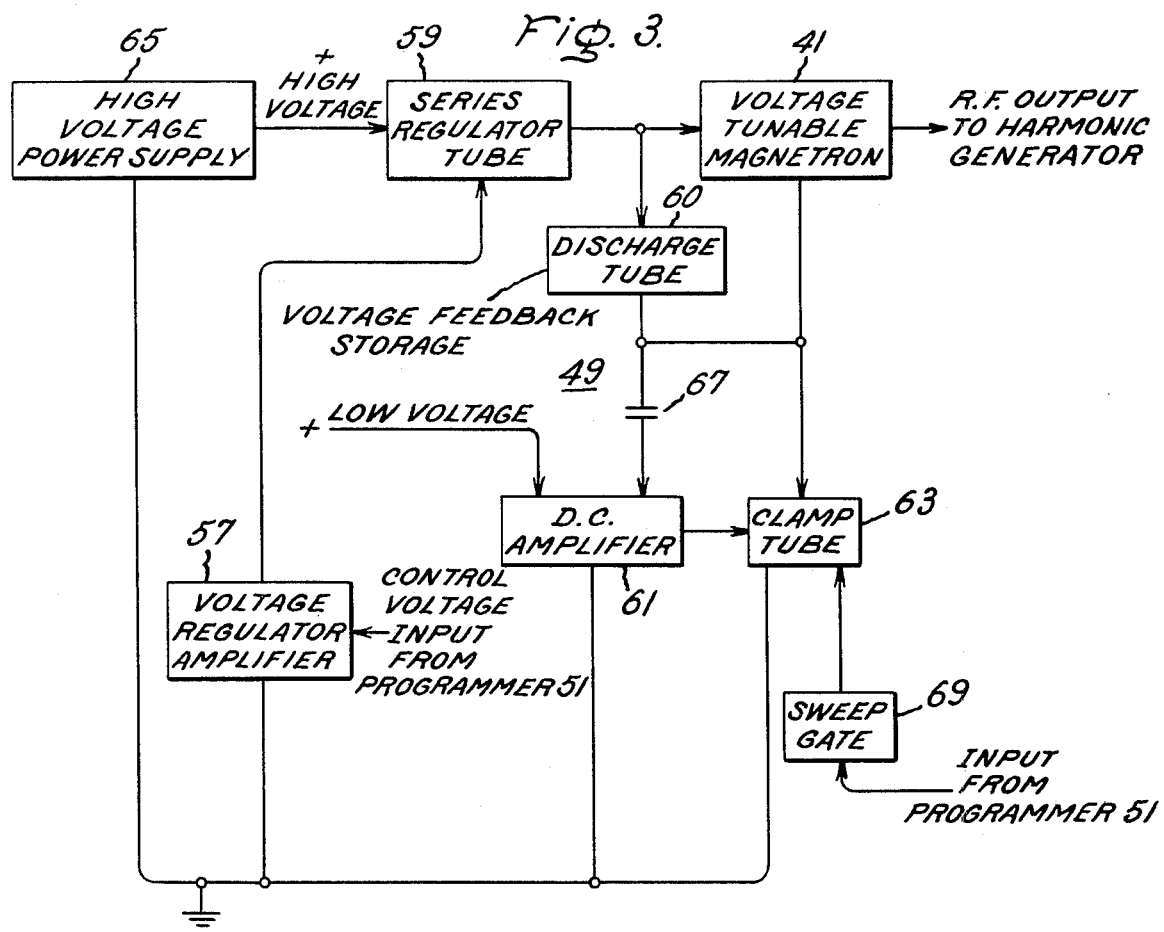
FIG. 3 illustrates in block diagram form one embodiment of the fast sweep modulator including the voltage tunable magnetron shown in FIG. 2.

In FIG. 3 there is illustrated in block diagram form one embodiment of the sweep control section or fast sweep modulator 49 including the voltage tunable magnetron 41 shown in FIG. 2. As shown therein, modulator 49 includes a voltage regulator amplifier 57, a series regulator tube 59, a discharge tube 60, DC amplifier 61, a clamp tube 63, and a high voltage power supply 65, all of which are well known in the art. Feedback storage means including capacitor 67, DC amplifier 61 and clamp tube 63 is coupled to the cathode of voltage tunable magnetron 41.

Series regulator tube 59 tends to maintain a constant voltage across the voltage tunable magnetron 41 and clamp tube 63 for wide variations in the high-voltage supply 65. The output voltage from the high-voltage supply 65 is regulated by series regulator 59. This voltage is reduced as much as necessary upon commands from programmer 51 to be explained hereinafter.

Just prior to ordering a sweep the programmer 51 sets the voltage across the voltage tunable magnetron 41 such that its output frequency is slightly higher than the instantaneous frequency of the fast tuned magnetron 27. Upon receipt of a synchronizing pulse from the synchronizer 54, the magnetron modulator 53 generates the modulation pulse for the fast tuned magnetron 27. Simultaneously, the programmer 51 orders a sweep of the fast sweep modulator 49. This action sweeps the VTM 41 very rapidly down in frequency. As the VTM 41 sweeps, signals as described previously are received by the programmer from the IF and anticipation filters 45 and 47 which initiate the stop action. This stops the frequency sweep of the VTM 41 and activates the feedback means. The feedback system then maintains constant the voltage across the VTM 41 which existed at the instant of the stop command. This instantaneous frequency output of the voltage magnetron 41 into the harmonic generator 43 is, as described previously, the correct frequency such that the difference between the frequency of the fast tuned magnetron 27 and the harmonic generator 43 is the receiver intermediate frequency. The duration of the holding action is such that the VTM 41 is held on frequency throughout the maximum range time of the radar system.

As mentioned hereinbefore, programmer 51 provides three main functions, namely, to random tune the transmitter, to sequence AFC operation to track the transmitter frequency, and to sample the frequency band and avoid interfering frequencies of other transmitters. The random tuning is accomplished by a noise modulated triangular wave pattern. The output of the random tuning portion of the programmer 51 controls the tuning control 29 which drives the hydraulically tuned magnetron 27. This tuning sample is also sampled for the purpose of positioning the range over which VTM 41 will be swept each time a pulse is transmitted. Just prior to each pulse transmission, programmer 51 adjusts voltage regulator amplifier 57 so that the VTM 41 frequency will be slightly higher than that of transmitting magnetron 27.

The sampling of the noise modulated triangular waveform is conveniently obtained at the pulse repetition rate of the radar system by a gate such as a flip-flop which is responsive to synch pulses at the pulse repetition frequency. Each of the resulting signals determines first the transmission frequency for the particular pulse and second a coarse adjustment for the receiver. The coarse adjustment tunes the receiver above the transmission frequency from which it sweeps down. In order for the fine tuning to be achieved in the shortest time, the coarse tuning frequency is selected to be the minimum frequency which can be relied upon to insure that the receiver will lock on to the individual pulse frequency.

At the start of the transmitted pulse, programmer 51 starts the sweep gate 69 by applying a singal thereto. The applied signal to sweep gate 69 opens clamp tube 63. Discharge tube 60 is automatically put into operation when clamp tube 63 is opened. This action initiates a frequency sweep of VTM 41 in a downward direction, toward the transmitter frequency because VTM 41 is swept down in voltage.

When the sweep has progressed to the desired voltage (frequency), such as, where there is a 60 mc difference between the transmitter and VTM 41, a signal appears from anticipation filter 47 (60 mc portion of the IF section) and programmer 51 stops the fast sweep by applying a signal to sweep gate 69 which, in turn, turns off the clamp tube action. A slower sweep, or drift, is caused to continue until the difference, or beat frequency, is 30 mc. The IF filter 45 (30 mc portion of the IF section) transmits this information to programmer 51 which then cuts off all tuning and allows the clamp tube to maintain the VTM 41 frequency until the end of the receiver action time. This is accomplished because the voltage on the cathode of VTM 41 is maintained constant by clamp tube 63 through the feedback means comprising capacitor 67, DC amplifier 61 and clamp tube 63 acting as a series regulator.

During the "dead time" between the end of the receiver "on" period and the start of the next pulse, programmer 51 will position VTM 41 to its upper frequency limit, and sweep down through the entire frequency band. This action allows the receiver to examine the band for jamming. If jamming is detected, programmer 51 stores the information that a certain segment of the band is being jammed. When magnetron 27 and tuning control 29 approach this frequency region, they are switched to a new schedule, and headed away from the jammed frequencies. This band is examined during each interpulse interval so that there will be a very high probability of detecting jamming before it interfers with the radar operation.

Figure 4:
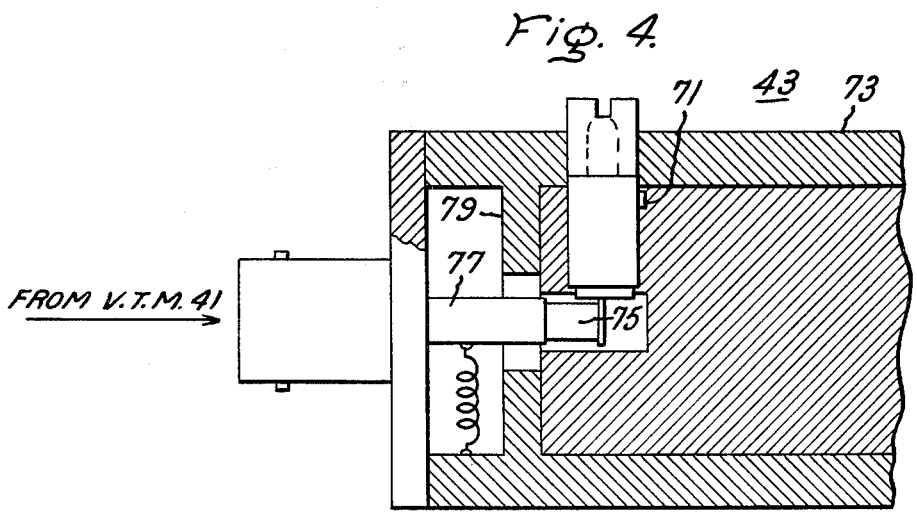
FIG. 4 shows one embodiment of the harmonic generator of FIG. 2.

In FIG. 4 there is illustrated one embodiment of the harmonic generator 43 shown in FIG. 2. Harmonic generator 43 utilizes semi-conductor diodes for frequency multiplication without requiring mechanical tuning. When used in conjunction with a voltage tunable oscillator, such as, VTM 41, generator 43 will provide a voltage tunable source of R.F. energy at a higher frequency than that of the oscillator.

Generator 43 has a broadband input and output, thus, eliminating the need for adjustment whenever the input frequency from VTM 41 is changed. As seen in FIG. 4, the diodes or crystals 71 are placed radially between inner and outer coaxial conductors of a coaxial waveguide 73. The center conductor 75 is terminated at the point at which the diodes 71 make contact. The outer conductor is extended forming a section of cylindrical waveguide.

This arrangement of crystals sets up the $TM_{01}$ mode in the cylindrical waveguide 73 which is designed to propagate the desired harmonic in this mode. A coaxial transformer 77 and a capacitive window 79 which match the multiple crystals to the line over the desired frequency range is placed at the input side. A probe (not shown) along the axis of the cylindrical waveguide couples the output power to the coaxial line. If desired, a right angle transducer (not shown) may be used to couple the $TM_{01}$ mode of the cylindrical waveguide to the dominant mode of a rectangular waveguide.

Harmonic generator 43 as explained hereinbefore is not required to practice this invention. Use of the generator is required where VTM 41 cannot provide the necessary high frequency output required for a particular radar application.

A representative programmer unit 51 is diagrammatically shown in FIG. 5. A timing unit 114, of the programmer, controls the operation and timing of the events which are under programming control. The timing unit is diagrammatically shown as a box representing the timing cycle from the beginning of a radar synchronizing pulse from unit 54 to the beginning of the next synchronizing pulse. This is shown in this manner in order to illustrate diagrammatically the relative timing of the various events. The timing unit 114 conveniently consists of a series of monostable multi-vibrators which are timed appropriately for each event. At the time of the synchronizing pulse from a radar synchronizer 54 the timing unit emits a pulse slightly longer than the radar transmitted pulse. This in turn opens two gated threshold circuits 110 and 111. These circuits produce an output pulse whenever the input voltage rises above a predetermined threshold voltage value, provided the circuit is enabled by a gating signal. This pulse from the timing unit 114 also sends a sweep start pulse to the sweep gate 69 of the fast sweep modulator 49. By this action, the fast sweep of the voltage tunable magnetron is started and the threshold circuits are enabled as the voltage tunes down the band. When its frequency approaches that of the transmit magnetron, which is also transmitting at that time under control of the radar synchronizer 54, a signal appears in the anticipation filter 47. This signal is amplified by amplifier 112. When the signal from amplifier 112 exceeds the threshold voltage of the gated threshold circuit 110, a pulse is sent to sweep gate 69 which stops the fast sweep of the voltage tunable magnetron. The output of the AFC IF filter 45 is connected to an amplifier 113 and in turn sent to a gated threshold circuit 111. The pulse which stopped the fast sweep allows the fast sweep modulator 49 to continue a slow sweep. When the signal from amplifier 113 exceeds the threshold voltage of gated threshold circuit 111, another pulse is sent to sweep gate 69 which stops the slow sweep. By this action, the voltage tunable magnetron 41 has been swept down the band and stopped at a difference frequency equal to that of the intermediate frequency. Through the action of the fast sweep modulator 49, the voltage tunable magnetron 41 will remain on the selected frequency until the radar return signals are received. After a fixed interval which is equal to the length of time that return signals are to be received, another pulse is emitted from the timing unit 114 and sent to gate circuit 115. Gate circuit 115 upon being enabled sends a voltage which is proportional to the upper frequency of the radar band of interest to voltage regulator 57 of the fast sweep modulator 49. By this action, the voltage tunable magnetron 41 has been placed at the upper edge of the frequency band of interest. After a short delay to allow the voltage tunable magnetron 41 to come to rest at the selected frequency, timing unit 114 emits another pulse to the sweep gate 69 to start another sweep. This signal is also sent to gate circuit 116. A voltage from the voltage tunable magnetron 41 which is proportional to the frequency of the magnetron is sent through gate 116 upon being enabled. A signal from the conventional mixer IF amplifier 35 is sent to threshold circuit 117. This circuit, as with the other threshold circuits, produces an output voltage signal when the receiver input signal exceeds its threshold value. As the voltage tunable magnetron 41 continues down the band, threshold circuit 117 will be energized if the receiver encounters jamming signals, which in turn operates the gate of the voltage storing circuit 118. Upon being energized, circuit 118 stores the instantaneous sweep voltage from the voltage tunable magnetron 41. Thus, this circuit stores a voltage proportional to the frequency of the jamming signal that was encountered. This storage circuit consists of a high gain integrator which is opened at the time of gating and thereby, holds its charge until otherwise modified. In order to control the fast tuned magnetron 27, a noise generator 119, a low pass filter 120 and a limiter 121 are used to provide random tuning directions for the fast tuned magnetron 27. The signal from the noise generator 119 is filtered by the action of a low pass filter 120 and in turn limited to two voltage levels by the limiter of 121. These two voltages represent up tuning and down tuning of the magnetron 27. In order to avoid jamming, and to turn the magnetron around at the end of a band, a direction control circuit 122, a simple flip-flop circuit, reverses the signal from limiter 121 if it is calling for the incorrect tuning direction. That is, if the limiter 121 is producing a voltage to tune the fast tune magnetron 27 up the band, but an end of band signal from tuning unit 29 appears, the direction control 122 reverses the polarity of the limiter signal 121, thereby sending a signal to tuning unit 29 to reverse the direction of tuning. In addition the direction control circuit 122 is under control of the gated sweep storage 118. If the limiter 121 is causing the magnetron 27 to tune up the band, but gated sweep storage 118 has stored a sweep voltage representing a jamming signal slightly further up the band, the direction control 122 uses this stored voltage to reverse the limiter 121 output to turn the fast tuned magnetron 27 down the band. The feedback signal from direction control 122 to gated sweep storage 118 is used to only allow sweep voltages which represent jamming signals in the vicinity of the anticipated transmitted frequencies of the fast tuned magnetron 27 to be stored. This feedback prevents the storage of jamming signals which are too far removed from the present position of the fast tuned magnetron 27 to be of interest.

It will be obvious to those skilled in the art by comparing the radar system shown in FIG. 1 with the transmission frequency diversity radar system illustrated in FIG. 2, that existing radar systems can easily be modified to incorporate the novel features of present invention and provide a pulse-to-pulse tunable radar. In addition to receiver 35, the receiver portion of the system would include the voltage tunable magnetron 41, harmonic generator 43 (where necessary) fast sweep modulator 49, filters 45 and 47, and programmer 51. It will be further recognized that applicant's novel radar system is capable of incorporation in search and fire control systems and, in addition, may be employed against jamming systems for preventing unfriendly transmissions from being effective.

While particular embodiments of the invention have been shown and described herein, it is not intended that the invention be limited to such disclosures, but that changes and modifications can be made and incorporated within the scope of the claims.

What is claimed is:

1. A transmission frequency diversity radar system comprising an oscillator that is tunable over a frequency band to produce a signal for radar transmission, means for tuning said oscillator randomly on a random frequency basis, and means for frequency tracking the signal being transmitted including a variable frequency local oscillator, means to sweep the local oscillator over a range of frequencies within the pulse width time of the radar transmitted signal but after said transmission oscillator is tuned and modulator means responsive to the transmitted signal for holding said variable local oscillator on the proper tuning frequency.

2. A transmission frequency diversity radar system comprising a magnetron oscillator that is tunable over a frequency band to produce a signal for radar transmission, means for rapidly tuning said oscillator on a pulse-to-pulse basis, and means for frequency tracking the signal being transmitted including a variable frequency local oscillator, means to sweep the local oscillator over a range of frequencies within the pulse width time of the radar transmitted signal but after said transmission oscillator is tuned and modulator means responsive to the transmitted signal for holding said variable local oscillator on the proper tuning frequency.

3. A transmission frequency diversity radar system comprising a microwave oscillator capable of being tuned randomly on a pulse-to-pulse basis to produce a signal for radar transmission, a voltage tunable oscillator the frequency of which is initially at a higher frequency than said microwave oscillator, modulator means for sweeping said tunable local oscillator down in frequency during the transmitted pulse of said microwave oscillator to a frequency which is offset from the frequency of the transmitted pulse by the intermediate frequency of said system, and servo means responsive to the transmitted pulse for maintaining the frequency of said voltage tunable oscillator at the intermediate frequency offset with respect to said microwave oscillator frequency.

4. The invention as defined in claim 3 wherein said frequency maintaining means includes a feedback means.

5. The invention as defined in claim 3 including filter means for stopping the sweep of the local oscillator to produce the intermediate frequency of said system.

6. A transmission frequency diversity radar system including means for transmitting signals in a frequency band on a random basis, a variable frequency local oscillator, means to sweep the local oscillator over a range of frequencies within the pulse width time of the radar transmitted signal, modulator means responsive to the transmitted signal for holding said variable local oscillator on the tuning frequency, means for sweeping said frequency band to detect transmissions from other transmitters, and means for changing the frequency of the transmitting signals in said frequency band to a frequency other than the detected frequencies of said other transmitters.

* * * * *